No. 774,587. PATENTED NOV. 8, 1904.
E. W. LINDQUIST.
TRUCK FOR HANDLING METAL.
APPLICATION FILED FEB. 19, 1904.
NO MODEL. 2 SHEETS—SHEET 1.

WITNESSES
Warren W. Swartz

INVENTOR
Edward W. Lindquist
by Bakewell & Byrnes
his Attorneys

No. 774,587. PATENTED NOV. 8, 1904.
E. W. LINDQUIST.
TRUCK FOR HANDLING METAL.
APPLICATION FILED FEB. 19, 1904.
NO MODEL. 2 SHEETS—SHEET 2.

WITNESSES
INVENTOR
Edward W. Lindquist
by his Attorneys
Bakewell & Byrnes

No. 774,587.

Patented November 8, 1904.

UNITED STATES PATENT OFFICE.

EDWARD WILLIAM LINDQUIST, OF CHICAGO, ILLINOIS, ASSIGNOR TO RALPH BAGGALEY, OF PITTSBURG, PENNSYLVANIA.

TRUCK FOR HANDLING METAL.

SPECIFICATION forming part of Letters Patent No. 774,587, dated November 8, 1904.

Application filed February 19, 1904. Serial No. 194,354. (No model.)

*To all whom it may concern:*

Be it known that I, EDWARD WILLIAM LINDQUIST, of Chicago, Cook county, Illinois, have invented a new and useful Truck for Handling Metal, of which the following is a full, clear, and exact description, reference being had to the accompanying drawings, forming part of this specification, in which—

Figure 1:
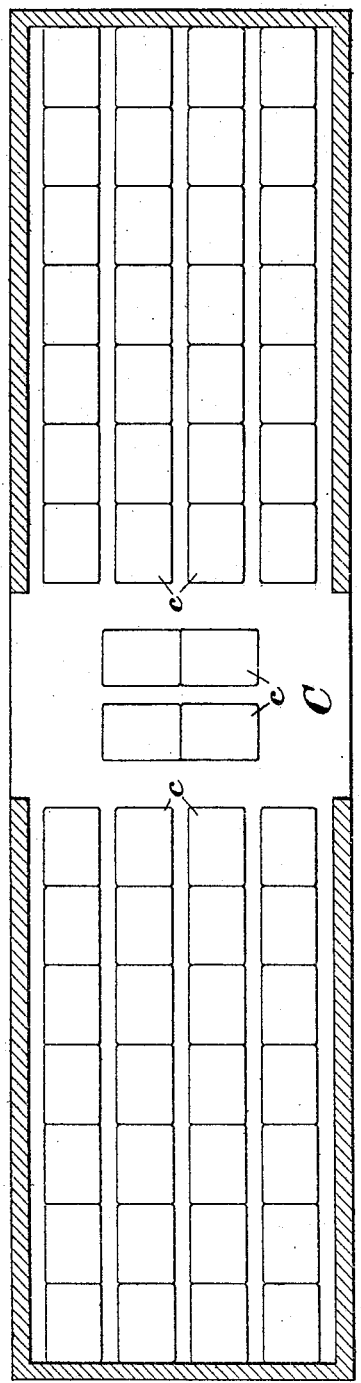
Figure 2:
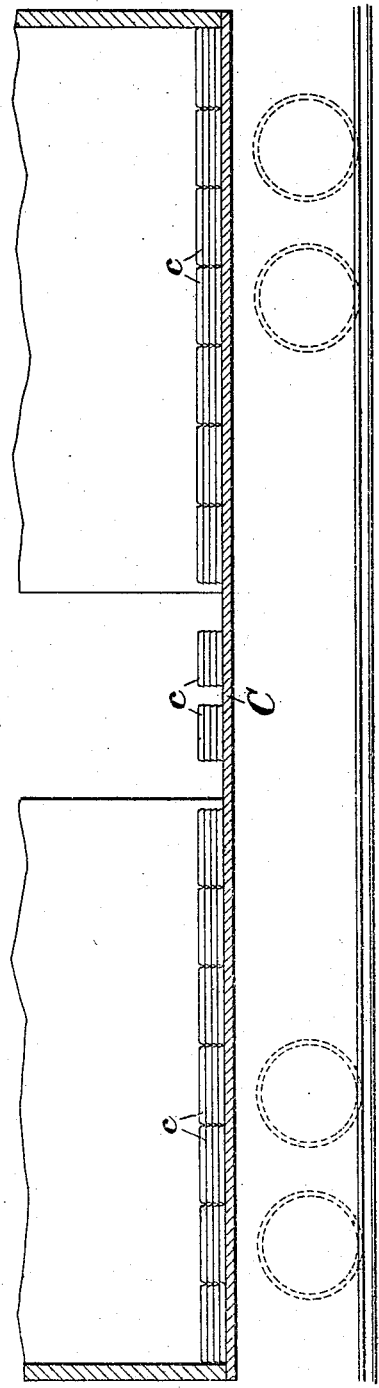
Figure 3:
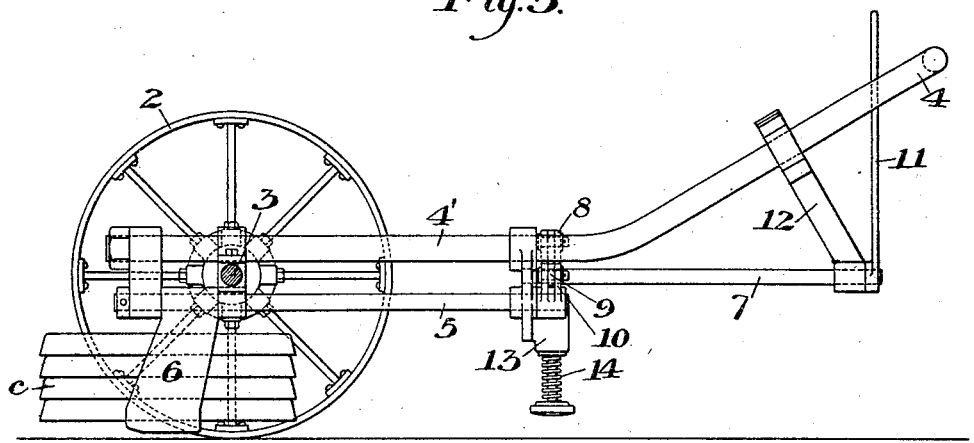

Figure 1 represents a top view of the interior of an ordinary railroad box-car, showing the manner in which such car is loaded with approximately sixty thousand pounds of blister-copper. Fig. 2 is a sectional side view of the same. Fig. 3 represents a sectional side view, and Fig. 4 a sectional end view, illustrating the truck that constitutes the subject-matter of this application.

The object of my invention is to expedite and to cheapen the transfer of blister-copper from the scales on which it has been weighed after sampling into an ordinary box-car for shipment. It constitutes a part of a complete system which enables one man in a period of ten hours to drill and sample correctly each of two hundred and forty separate plates, which together constitute an ordinary box-car load of thirty tons, and to weigh and to record the weight and to load these plates into a box-car for shipment, so that the entire thirty tons of blister-copper shall be evenly and properly distributed over the floor of such car. This portion of the cost of producing blister-copper—to wit, the drilling of samples correctly from each plate, the weighing of the copper accurately and recording such weights, and the loading of this copper in a proper manner for shipment—is thus reduced to a cost of approximately ten cents per ton.

Figure 4:
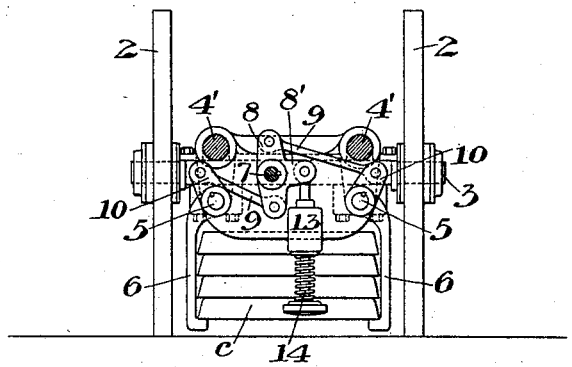

As illustrated in Figs. 3 and 4, one truck-load of copper consists of four (4) plates, each weighing approximately two hundred and fifty pounds. Hence one man by means of this truck lifts four plates in a single pile from the scales on which they have been weighed and transfers them to their proper position in the box-car, the first load being delivered at one end of the car and the remainder following in regular sequence, as shown in Figs. 1 and 2, until one end of the car has been completely loaded. Thereafter the other end of the car is loaded in a similar manner, and the last four piles that are loaded into the car are deposited in the center thereof, as shown in Figs. 1 and 2.

The truck is provided with wheels 2 2, journaled on suitable axle 3, and in order to make it possible for one man to load and transfer, say, one thousand pounds of copper at a single operation a suitable leverage by means of the handles 4 is provided. These handles are connected with the axle and constitute the frame of the truck. 5 5 are horizontal shafts which are supported from the frame 4' and carry the supporting-arms 6 6, which are hooked at their lower ends, as shown in Fig. 4, and can be swung readily toward and from each other by rotating the shafts 5. These shafts are rotated from a middle shaft 7, which is connected therewith by a rock-lever 8, links 9 9, and crank-arms 10. The shaft 7 may be rotated by hand by means of a lever 11, which extends in proximity to the handle 4, so that it may be easily moved by the operator. The shaft 7 is supported in bearings in a brace 12, which depends from the handles 4. I also provide an automatic trip for rotating the shaft, and thus swinging the arms 6. This automatic trip consists of a post 13, connected at its upper end to an arm 8' of the rock-lever 8 and having at its lower end an adjustable extension 14, which may be extended or shortened in length, as desired. The operator may therefore open the arm 6 either by turning the lever 11 or by lowering the handle of the truck, so as to cause the post 13 14 to engage the floor, and thus to press upwardly on the arm 8' of the rock-lever 8. The powerful leverage thus afforded will throw open the arm 6, on which the plates of copper *c* rest, and will permit the plates to drop directly to the floor of the car C.

In the operation of the device the truck is moved to the scales on which the copper has been weighed and at which the plates of copper are accumulated in piles of preferably four plates each, which rest on narrow strips upon the bed of the scales, in which position they are weighed and their weight recorded. The truck is then backed to the scales, and the operator moves the lever 11, so as to open the arms 6, in which position they may be applied to the four plates of the pile. Then by moving the lever back and bearing down on the handle of the truck the operator lifts the pile of plates, pushes the truck into the box-car, and then by opening the arms 6 either automatically or by hand, as above described, the plates are dropped upon the floor of the car.

The wheels are made preferably large to facilitate the movement of the heavy load and are preferably provided with roller-bearings.

The platform leading from the scales to the door of the box-car is preferably arranged on a slight downward incline toward the car and should be made of plank carefully matched and covered with steel plates. Provision is also made whereby the space between the loading-platform and the car is covered with steel plates, so that the operator can readily deliver the loads to their correct position in the car. When the truck is brought to the place in the car where the operator desires to drop the pile of plates, two modes are provided for releasing them from the truck and for dropping them into their correct position, as above stated.

Many variations in the arrangement of the details of this truck can be made by those skilled in the art without departing from my invention as defined in the claims, since

What I claim is—

1. A truck having handles, depending holding-jaws and shafts therefor, and a single operating-shaft extending along the handles and connected with the first-mentioned shafts by an intermediate lever; substantially as described.

2. A truck having holding-jaws and lever mechanism adapted to operate the same, and a trip adapted to engage the floor or ground and to move the lever mechanism automatically; substantially as described.

3. A truck having holding-jaws and lever mechanism adapted to operate the same, and an adjustable trip adapted to engage the floor or ground and to move the lever mechanism automatically; substantially as described.

In testimony whereof I have hereunto set my hand.

EDWARD WILLIAM LINDQUIST.

Witnesses:
WILLIAM M. KIRKPATRICK,
W. D. KYLE.